(12) United States Patent
Waller

(10) Patent No.: US 7,322,890 B2
(45) Date of Patent: Jan. 29, 2008

(54) STEERING COUPLER

(76) Inventor: Charles L. Waller, 6379 Morningside Dr., Hubbard, OH (US) 44425

( * ) Notice: Subject to any disclaimer, the term of this patent is extended or adjusted under 35 U.S.C. 154(b) by 245 days.

(21) Appl. No.: 11/189,296

(22) Filed: Jul. 26, 2005

(65) Prior Publication Data

US 2006/0043719 A1 Mar. 2, 2006

Related U.S. Application Data

(60) Provisional application No. 60/603,986, filed on Aug. 24, 2004.

(51) Int. Cl.
*F16D 7/02* (2006.01)
(52) U.S. Cl. .......................... 464/45; 74/492
(58) Field of Classification Search ............ 464/45–48, 464/903; 192/107 M; 74/492
See application file for complete search history.

(56) References Cited

U.S. PATENT DOCUMENTS

| | | | | |
|---|---|---|---|---|
| 3,157,978 A | * | 11/1964 | McMullen | ................ 464/45 X |
| 4,474,080 A | * | 10/1984 | Day | .......................... 464/46 X |
| 4,743,634 A | * | 5/1988 | Royer | ............... 192/107 M X |
| 5,178,251 A | * | 1/1993 | Losi, Jr. | ................... 464/47 X |

FOREIGN PATENT DOCUMENTS

| | | | | |
|---|---|---|---|---|
| DE | 849 362 | * | 9/1952 | ................... 464/46 |
| JP | 2-267072 | * | 10/1990 | ................... 74/492 |

* cited by examiner

*Primary Examiner*—Greg Binda
(74) *Attorney, Agent, or Firm*—James R. Williams

(57) ABSTRACT

A steering coupling reduces the rotational force felt by a driver should the wheels impact an obstacle. The coupling is particularly suited for vehicles comprising simple, single-unit steering assemblies. The coupling permits a certain amount of slippage between the wheels and the steering wheel without a total loss of steering. The driver may set a threshold torque at which slippage occurs, thereby controlling the "feel" of the steering. The coupling includes a friction disc that permits rotational movement between two housings in the steering assembly.

10 Claims, 3 Drawing Sheets

STEERING COUPLER

The present application claims priority to U.S. 60/603,986, filed 24 Aug. 2004.

FIELD OF THE INVENTION

The present invention is directed to a steering coupling and is especially adapted for motor vehicles having a single unit steering system.

BACKGROUND OF THE INVENTION

Steering systems of certain motor vehicles, such as racecars, demolition derby cars and off-road vehicles, include a direct link between a steering wheel and wheels. The steering wheel is rigidly secured to a steering column. The steering column is connected to a mechanism that translates rotational motion of the steering wheel into a turning motion of the wheels. In one embodiment, the mechanism includes tie rods attach directly to the steering column. Each tie rod is connected to one of the wheels. Turning the steering wheel rotates the steering column and translates the tie rods in opposite directions, thereby moving the wheels in the intended direction.

Advantageously, this system is simple, inexpensive, easily repaired, and affords positive steering feedback to the driver. But this system does include a major shortcoming. While any movement of the steering wheel will induce movement in the wheels, the inverse is also true, that is, movement of the wheels will cause the steering wheel to turn. Motor vehicles can travel at high speeds. The wheels impacting a curb or other obstruction at high speed can cause the steering wheel to rotate violently.

Drivers tend to grip tightly the steering wheel, especially at high speed. A sudden violent rotation of the steering wheel contains enough energy to injure the driver. Injuries include broken bones, especially the wrists and thumbs, sprains, contusions and bruising. Even if the driver escapes injury, the sudden movement of the steering wheel can cause the driver to lose control of the vehicle at least temporarily.

Previous attempts to overcome this problem include the installation of power steering systems, electronic torque converters, and breakaway mechanical linkages. Power steering systems add significant complexity and weight to the steering system and reduce, but do not eliminate, the risk. Electronic systems can be effective, but are expensive, difficult to install, and subject to breakdown. Breakaway linkages include gear or pin mechanisms that are designed to disengage or shear at excessive torque. Unfortunately, this leads to at least a temporary loss in steering control.

An object of this invention is to provide a simple device that passively controls violent rotation of a steering wheel when the wheels impact an obstacle, thereby reducing injury to the driver. The invention should also at all times retain positive steering feel and control.

BRIEF DESCRIPTION OF THE INVENTION

The present invention relates to a coupling that reduces the rotational force felt by a driver should the wheels impact an obstacle. The coupling is particularly suited for vehicles comprising simple, single-unit steering assemblies.

The coupling permits a certain amount of slippage between the wheels and the steering wheel without a total loss of steering. The driver may set a threshold torque at which slippage occurs, thereby controlling the "feel" of the steering.

In one embodiment, the coupling comprises a friction disc secured between a second housing and an first housing. The coupling is conveniently located just under the steering wheel. The friction disc rotationally unites the housings so long as the torque between the wheels and the steering wheel remains below the threshold torque. Above the threshold torque, the friction disc permits rotational motion between the housings.

The threshold torque may be exceeded, for example, when the wheels impact an obstruction that causes a torque above the threshold. The coupling prevents torque above the threshold from passing to the steering wheel. Injury to the driver can be avoided. Steering feel is retained. Once the obstruction is passed, full steering control can be regained.

The driver may observe that the steering wheel has rotated off-center but no loss of steering control will be discerned after the incident. If desired, the steering wheel can be moved back to center once the vehicle is stopped. The coupling has no rotational stop limit so any number of impacts can be accommodated.

DETAILED DESCRIPTION OF THE INVENTION

The coupling of the present invention may be installed in a steering assemblage of a motor vehicle. Conveniently, the coupling is placed along the steering column and more conveniently is located adjacent to the steering wheel. The coupling may be placed anywhere in the steering system to control rotational torque. The coupling is intended to limit torque transmission between the wheels of the vehicle and the steering wheel. To this end, the shape and size of the coupling is constrained only by the steering assemblage. Cylindrical shapes are easily produced but the coupling is not limited to this configuration.

Figure 1:
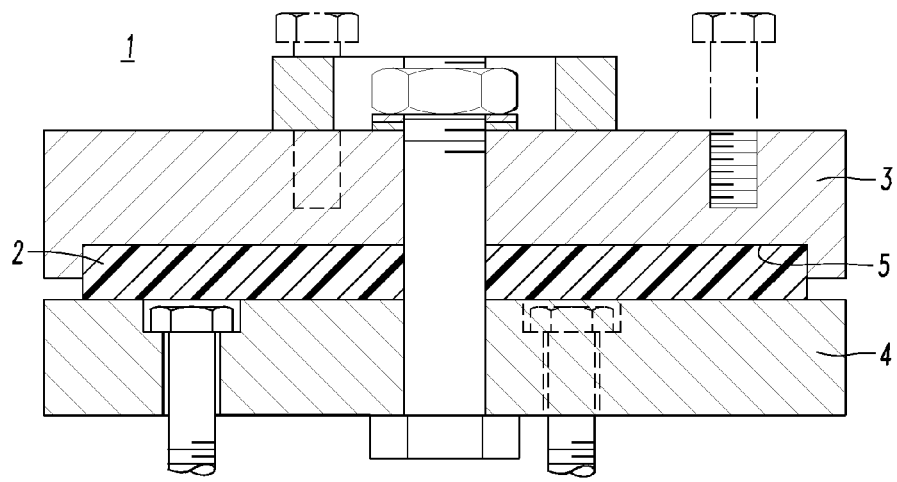
FIG. 1 is a cross-sectional view of the coupling.
Figure 2:
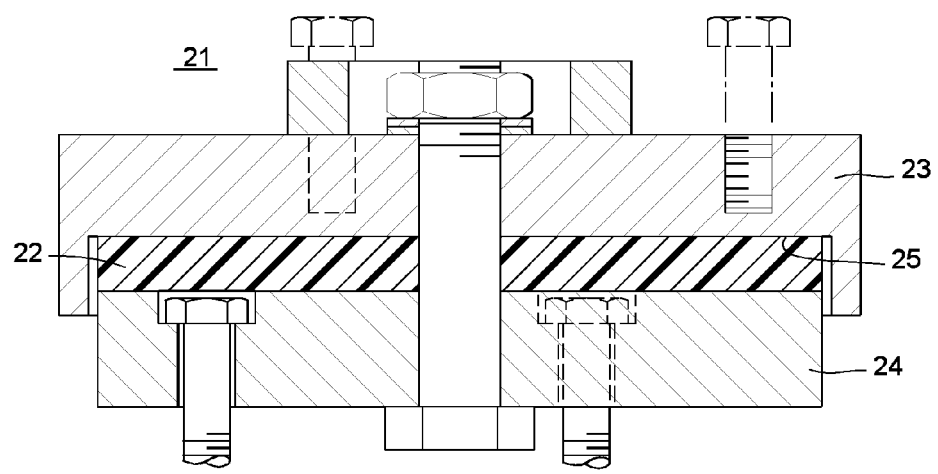
FIG. 2 is a cross-sectional view of an alternative embodiment of the coupling.

As shown in FIG. 1, the coupling 1 includes a friction disc 2 between a first housing 3 and a second housing 4. The friction disc 2 may be made from any type of friction material. Examples include impregnated and non-impregnated refractory fibers. A convenient friction material comprises rubber-impregnated fiber. Preferably, at least one housing defines a recess 5 for receiving the friction disc 2. FIG. 2 shows an alternative embodiment of the coupling 21 wherein the first housing 23 defines the recess 25 and the second housing 24 also fits at least in part into the recess 25. The housings 23, 24 should be positioned so that only the friction disc 22 translates torque between the housings 23, 24. For the embodiment of FIG. 1, this can mean making the friction disc 2 slightly thicker than the depth of the recess 5 so that the housings do not touch. In the embodiment of FIG. 2, the second housing 24 is smaller in diameter, at least in part, than the first housing.

A clamp sandwiches the friction disc 2 between the first housing 3 and second housing 4. The clamp exerts a compressive force, that is, a clamping pressure, on the housings. Preferably, the clamp permits adjustment of the clamping pressure. The pressure between the housings 3, 4 determines the threshold torque at which the friction disc 2 begins to slip between the housings 3, 4. The clamp may be any device capable of applying a compressive force on the housings, including clips, bolts, springs or other similar mechanical systems. Slippage of the friction disc 2 limits the torque that is transmitted along the steering assemblage. Increasing the pressure will permit greater torque before slippage, while lowering pressure causes slippage at lower torque. Besides pressure, several other factors, including the materials used, dimensions of the coupling, and wear, affect the threshold torque.

Figure 3:
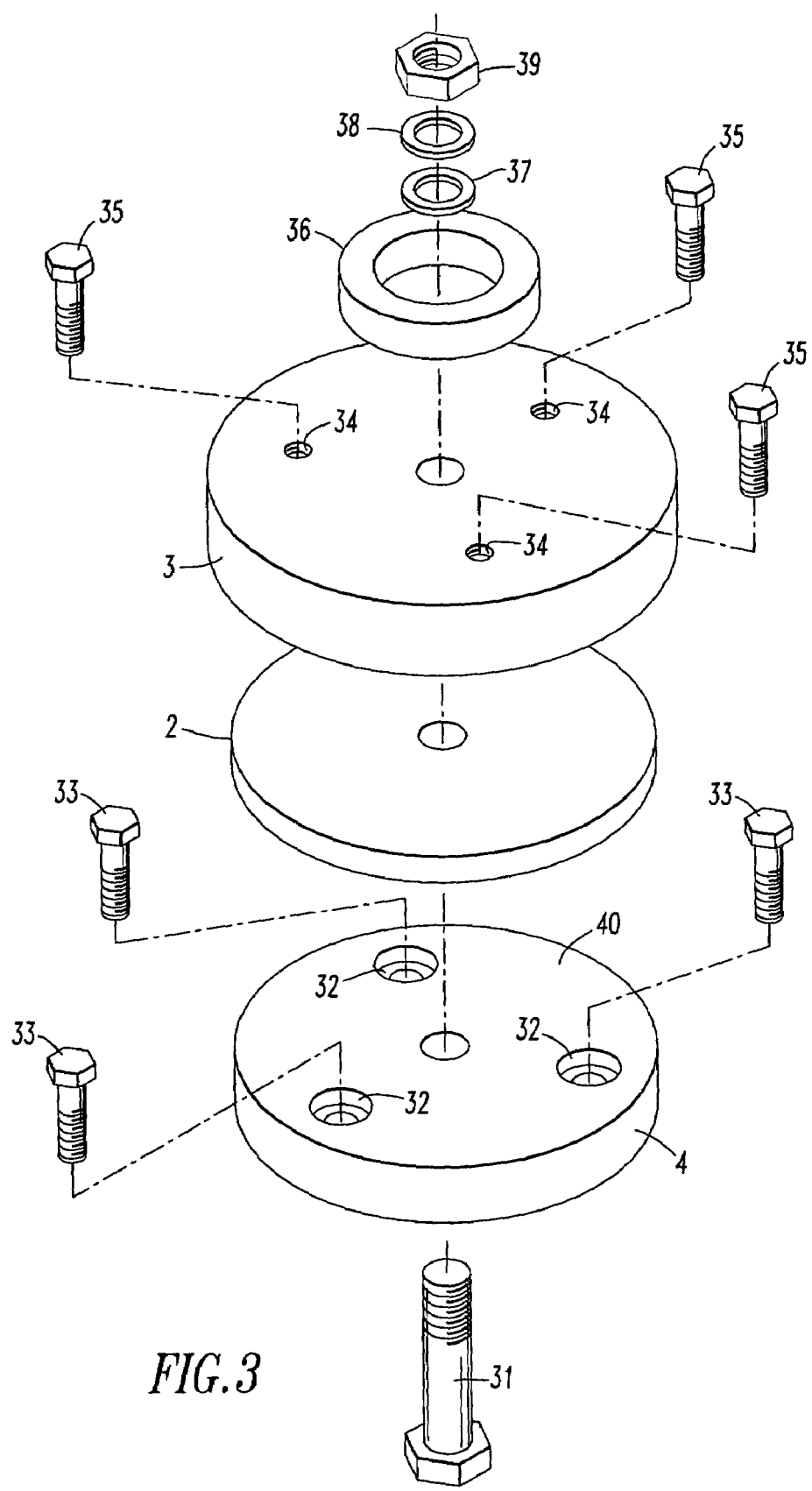
FIG. 3 is an expanded view of one embodiment of the coupling.
Figure 5:
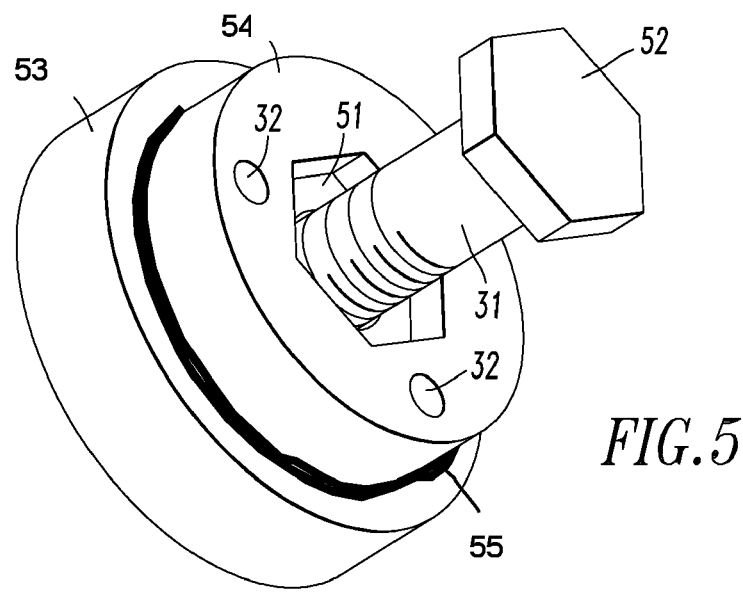
FIG. 5 is a view of the coupling showing a non-circular countersink.

FIG. 3 shows one embodiment of the present invention. This embodiment finds utility in racecar steering assemblies. An aligning bolt 31 extends through the second housing 4, the friction disc 2, and the first housing 3. The aligning bolt 31 is preferably countersunk in the second housing 2 and includes a non-circular head. A non-circular head simplifies installation on the racecar and reduces the chance of loosening the aligning bolt 1. FIG. 5 shows the first housing 53 defining a recess 55 for the second housing 54. The aligning bolt 31 has a non-circular head 52 that is adapted to fit in a non-circular countersink 51. In this embodiment, the aligning bolt 31 has a hexagonal head 52. The aligning bolt 31 is threaded at its other end.

Figure 4:
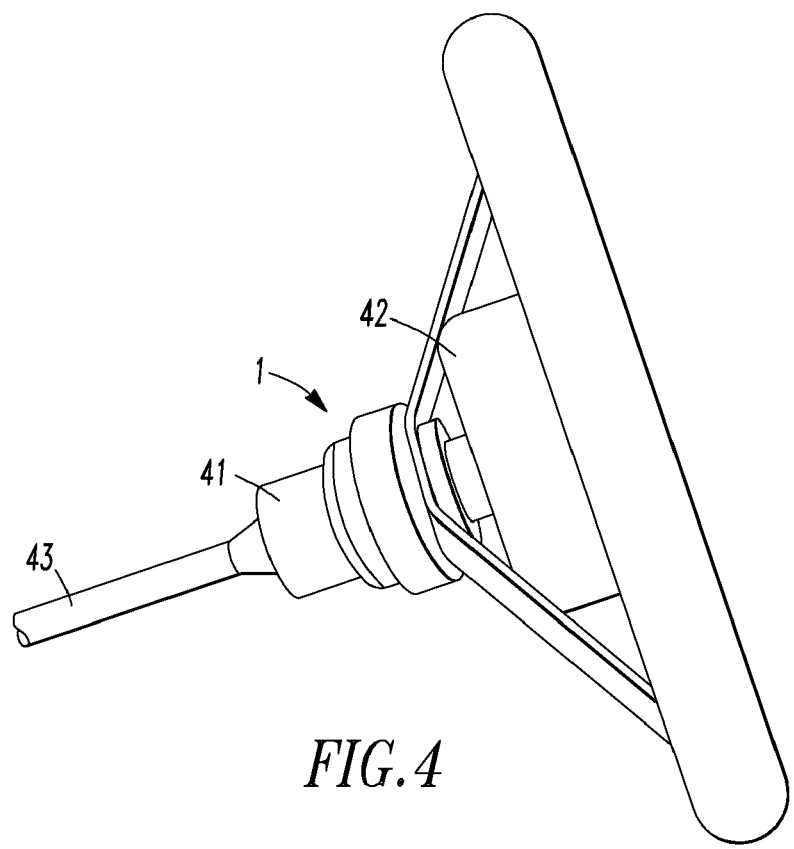
FIG. 4 shows the coupling affixed to a steering wheel and a steering column.

The second housing 4 includes a plurality of unthreaded holes 32 adapted to receive mounting bolts 33 by which the second housing is attached to a steering column. As shown in FIG. 4, the coupling 1 is fixed to a top 41 of the steering column 43. The coupling 1 is also fixed to the steering wheel 42. The mounting bolts 33 are preferably countersunk. The friction disc 2 rests on an upper surface 40 of the second housing 4. The first housing 3 rests on the friction disc 2. In this embodiment, the first housing 3 includes a recess 5 as shown in FIG. 2 to accommodate the friction disc and to fit partially over the second housing 4. The recess reduces misalignment of the friction disc 2 and, by placing the first housing 3 above the second housing 4, for example, by placing the first housing adjacent to a steering wheel and the second housing lower on a steering column, reduces accumulation of dirt or other contaminants in the area of the friction disc 2.

The first housing 3 includes a plurality of threaded holes 34 for receiving the steering bolts 35. The steering bolts 35 secure the steering wheel 42 to the first housing 3. Optionally, a spacer 36 may be needed depending on the steering wheel selected.

The alignment bolt 31 extends through the first housing 5 and any spacer 36. A spring assembly 37 is secured to the alignment bolt 31 with a washer 38 and nut 39. The spring assembly 37 in combination with the alignment bolt 31 and nut 39 exerts a compressive force on the housings 3, 4 and friction disc 2. The amount of compressive force depends on the geometry of the coupling and desired threshold torque. The compressive force should be greater than about 500 psi. Typically, the compressive force will be between 1000 psi and 3000 psi. Lower pressure will cause the coupling to slip at lower torque and could create "sloppy" steering. Higher pressures will produce tighter steering, but at the risk of driver injury.

The spring assembly 37 may include at least one Belleville washer, compression springs, split-ring lock washer, or other compressive device. Conveniently, a plurality of Belleville washers is used because of their compactness and ease of use. A Belleville washer is a disk spring that applies pressure to the connection once clamped with the proper amount of force. Advantageously, this washer exerts a clamping pressure along a continuous arc pattern instead of at one point. The nut 39 is preferably a locknut and is tightened to produce the desired compressive force. Care should be taken not to undertighten or overtighten the washers as this could affect the compressive force on the housings and friction disc.

EXAMPLE 1

Before the beginning of a race, a driver installed a steering coupler of the present invention on a car. Nearing the end of the race, the driver attempted to pass the leader on the inside of the track. The track included grader tires on the inside radius of the track. At high speed, the left front wheel of the car hit one of the grader tires. The impact tore the wheel spindle and brake assembly from the car. Only the yellow caution light alerted the driver to the damage to his car. Inspection revealed the steering coupler rotated more than 180 degrees. The driver suffered no injury. In contrast, without the steering coupler of the present invention, an accident of this type would likely have seriously injured the driver's wrists or hands.

EXAMPLE 2

A driver entered a race in a car equipped with the steering coupler of the present invention. The driver noticed a disabled car and attempted to avoid it. This caused his car to go into a spin. A third car collided with the driver's right front wheel. The driver went to the pit with what he thought was a flat tire. To his amazement, he found every bar on the right front steering assembly either broken or bent. The steering coupler had rotated 180 degrees, but the driver was not injured.

EXAMPLE 3

During a race, a first car having a steering coupler of the present invention spun out on a turn. A second car hit the first car on the left front tire. The driver of the first car managed to regain control and win the race. Post-race inspection revealed a bent spindle tie rod, helm joints and bars on the left wheel. The steering coupler had rotated about 90 degrees. The driver suffered no injury.

Obviously, numerous modifications and variations of the present invention are possible. It is, therefore, to be understood that within the scope of the following claims, the invention may be practiced otherwise than as specifically described.

What is claimed is:

1. A steering assembly for a motor vehicle comprising:
   (a) a steering wheel;
   (b) a steering column; and
   (c) a steering coupler comprising:
      (i) a first housing;
      (ii) a second housing;
      (iii) a friction disc;
      (iv) a clamp;
      (v) a nut; and
      (vi) an alignment bolt including a threaded end, the alignment bolt passing through in sequence the second housing, the friction disc, the first housing, the clamp, and the nut, where the nut is secured on the threaded end, and the clamp forcing the first housing and friction disc against the second housing so that rotational movement of the housings can occur above a threshold torque.

2. The steering coupler steering assembly of claim 1, wherein the first housing defines a recess, and the friction disc sets in the recess.

3. The steering assembly of claim 2, wherein the recess has a depth and the friction disc has a thickness greater than the depth, whereby the first and second housing are prevented from touching.

4. The steering assembly of claim 2, wherein the second housing also fits at least partially into the recess.

5. The steering assembly of claim 1, wherein the clamp is selected from a group consisting of clips, bolts, springs and Belleville washers.

6. The steering coupler of claim 1, wherein the first housing is fixedly secured to the steering wheel, and the second housing is fixedly secured to the steering column.

7. The steering coupler of claim 1, wherein the second housing defines a non-circular countersink, and the alignment bolt includes a non-circular head that fits into the countersink.

8. A steering assembly for a motor vehicle including:
   (a) a steering wheel;
   (b) a steering column; and
   (c) a steering coupler between the steering wheel and the steering column, the steering coupler comprising:
     (i) a first housing fixedly secured to the steering wheel,
     (ii) a second housing fixedly secured to the steering column,
     (iii) a friction disc between a the first housing and a the second housing, and
     (iv) a clamp that exerts a compressive force on the housings, whereby below a threshold torque the housings rotate in unison and above the threshold torque relative rotational movement of the housings can occur.

9. The steering assembly of claim 8, wherein the the compressive force on the housings is adjustable, whereby adjusting the compressive force alters the threshold torque.

10. A motor vehicle having a steering assembly, the steering assembly including:
   (a) a steering wheel;
   (b) a steering column; and
   (c) a steering coupler between the steering wheel and the steering column, the steering coupler comprising:
     (i) a first housing,
     (ii) a second housing,
     (iii) a friction disc between the first housing and the second housing, and
     (iv) a clamp that exerts a compressive force on the housings, whereby below a threshold torque the housings rotate in unison and above the threshold torque relative rotational movement of the housings can occur.

* * * * *